United States Patent [19]

Minagawa et al.

[11] 4,107,136

[45] Aug. 15, 1978

[54] SYNTHETIC RESIN STABILIZER COMPRISING AN ORGANIC PHOSPHITE AND A CARBONATE

[75] Inventors: Motonobu Minagawa, Kosigaya; Yutaka Nakahara, Iwatsuki; Tohru Haruna, Okegawa, all of Japan

[73] Assignee: Argus Chemical Corporation, Brooklyn, N.Y.

[21] Appl. No.: 729,975

[22] Filed: Oct. 6, 1976

[30] Foreign Application Priority Data

Oct. 6, 1975 [JP] Japan .................................. 50-120393

[51] Int. Cl.$^2$ .............................................. C08K 5/52
[52] U.S. Cl. ............................. 260/45.95 C; 252/404; 260/45.7 R; 260/45.95 D; 260/48.8 R; 260/45.95 R; 260/860; 260/45.85 S
[58] Field of Search ................... 260/45.8 R, 45.95 D, 260/47 XA, 463, 45.7 R, 45.95 R, 45.7 R, 860, 45.85 S; 252/404

[56] References Cited

U.S. PATENT DOCUMENTS

| | | | |
|---|---|---|---|
| Re. 27,682 | 6/1973 | Schnell et al. ................... | 260/47 XA |
| 2,946,766 | 7/1960 | Schnell et al. ................... | 260/47 XA |
| 2,999,841 | 9/1961 | Csendes .......................... | 260/45.95 E |
| 3,026,264 | 3/1962 | Rocklin et al. ................. | 260/45.95 B |
| 3,036,036 | 5/1962 | Howe .............................. | 260/47 XA |
| 3,047,608 | 7/1962 | Friedman et al. .............. | 260/45.8 R |
| 3,112,286 | 11/1963 | Morris et al. ................... | 260/894 |
| 3,136,741 | 6/1964 | Schnell et al. ................... | 260/47 XA |
| 3,239,484 | 3/1966 | Stark .............................. | 260/45.95 B |
| 3,244,650 | 4/1966 | Hecker et al. ................... | 260/45.95 E |
| 3,272,869 | 9/1966 | O'Shea et al. ................... | 260/45.95 C |
| 3,274,258 | 9/1966 | Odenweller ..................... | 260/45.95 C |
| 3,305,608 | 2/1967 | Baranaukas et al. ............. | 260/921 |
| 3,312,660 | 4/1967 | Kurkjy et al. ................... | 260/463 |
| 3,357,946 | 12/1967 | Burgess .......................... | 260/45.95 B |
| 3,420,894 | 1/1969 | Pierce et al. ..................... | 260/47 XA |
| 3,453,225 | 7/1969 | Pollock ........................... | 260/23 XA |
| 3,476,699 | 11/1969 | Kauder et al. ................... | 260/891 |
| 3,510,507 | 5/1970 | Bown et al. ..................... | 260/463 |
| 3,544,514 | 12/1970 | Schnell et al. ................... | 260/47 XA |
| 3,748,303 | 7/1973 | Becker et al. ................... | 260/47 XA |
| 4,009,148 | 2/1977 | Neuray et al. ................... | 260/463 |

OTHER PUBLICATIONS

Polymer Engineering and Science, Jul. 1966, pp. 231 to 239, Article by Gordon et al.

*Primary Examiner*—V. P. Hoke
*Attorney, Agent, or Firm*—Otto S. Kauder

[57] ABSTRACT

Stabilizer compositions are provided whose ingredients interact synergistically to improve the resistance to deterioration on heating of a variety of synthetic resin compositions. The interacting ingredients are (a) an organic phosphite having linked to phosphorus through oxygen at least two alkyl groups having from 6 to 20 carbon atoms and at least one organic group selected from polycyclic polyhydric phenol groups and pentaerythrityl groups, and (b) at least one carbonate ester of an ortho-substituted polyhydric phenol having in the molecule one to three benzenoid rings, two to three phenolic hydroxyl groups, and in each benzenoid ring one to two alkyl, cycloalkyl, or aralkyl groups of which at least one is positioned ortho to a phenolic hydroxyl group.

Synthetic resin compositions are provided that are stabilized with the stabilizer compositions disclosed, including olefin polymers, polyamides, acrylic polymers, and vinyl halide polymers.

19 Claims, No Drawings

-continued

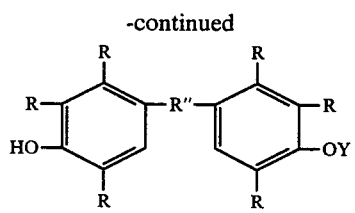

Where:

X is selected from the following: >P—OR'; >P—R';

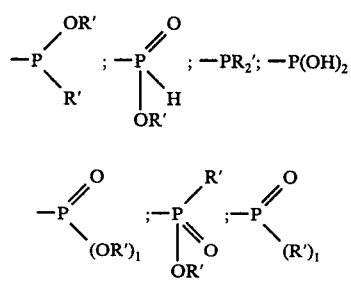

and Y is selected from the following: —P(OR')$_2$;

R is hydrogen, alkyl of 1 to 16 carbon atoms or aryl or a combination of these; R' is alkyl of 1 to 16 carbon atoms or aryl, and R'' is alkylidene of 1 to 16 carbon atoms or an aryl-substituted alkylidene.

C. Baranauckas, U.S. Pat. No. 3,305,608 of Feb. 21, 1967, disclosed phenolic phosphites useful as polymer stabilizers prepared by reacting a triorganophosphite, a polyol, and an aromatic material having two to six phenolic hydroxyl groups at 60°–180° C in specified proportions.

G. Brindell, U.S. Pat. No. 3,412,064 of Nov. 19, 1968 disclosed phenolic phosphites represented by the general formula:

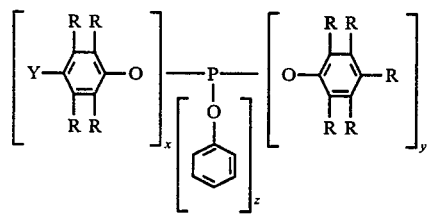

where x is from 1 to 3, y and z each from 0 to 2, x+y+z=3, R is hydrogen or alkyl and Y is hydroxyl or a group of the formula

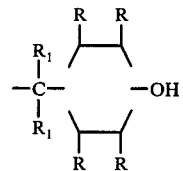

where R is hydrogen or alkyl M. Larrison, U.S. Pat. No. 3,419,524 of Dec. 31, 1968, disclosed phosphites useful as polymer stabilizers having the formula:

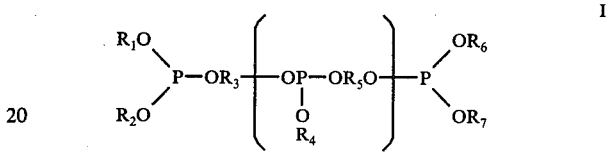

where $R_1R_2$, $R_4$, $R_6$, and $R_7$ are aryl or haloaryl, and $R_3$ and $R_5$ are a polyalkylidene glycol or an alkylidene bisphenol or a hydrogenated alkylidene bisphenol or a ring halogenated alkylidene bisphenol from which the two terminal hydrogens have been removed.

O. Kauder et al, U.S. Pat. No. 3,476,699 of Nov. 4, 1969 and 3,655,832 of Apr. 11, 1972 disclosed organic phosphites containing a free phenolic hydroxyl group and defined by the formula:

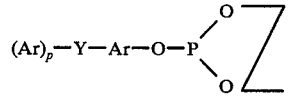

wherein Z is selected from the group consisting of hydrogen and aliphatic, cycloaliphatic, aromatic, heterocyclic and (Ar)$_p$—Y—Ar groups, taken in sufficient number to satisfy the valences of the two phosphite oxygen atoms; Y is a polyvalent linking group selected from the group consisting of oxygen; aliphatic, cycloaliphatic and aromatic hydrocarbon groups attached to each Ar group through a carbon atom not a member of an aromaic ring; oxyaliphatic; thioaliphatic, oxycyloaliphatic, thiocycloaliphatic; heterocyclic; oxyheterocyclic, thioheterocyclic, carbonyl, sulfinyl; and sulfonyl groups; Ar is a phenolic nucleus which can be phenyl or a polycarbocyclic group having condensed or separate phenyl rings; each Ar group is either connected through an oxygen atom to a phosphite group or contains a free phenolic hydroxyl group, or both; and p is a number, one or greater, and preferably from one to four, which defines the number of Ar groups linked to Y.

L. Friedman, U.S. Pat. No. 3,516,963 of June 23, 1970, disclosed phosphites having the formula:

SYNTHETIC RESIN STABILIZER COMPRISING AN ORGANIC PHOSPHITE AND A CARBONATE

BACKGROUND OF THE INVENTION

This invention relates to new stabilizer combinations, and to synthetic resin compositions, particularly olefin polymer, acrylic polymer, vinyl halide polymer, and polyamide compositions containing the same, and having as a result an increased resistance to deterioration in color and mechanical properties when heated at elevated temperatures of the order of 150° C and higher.

Many organic phosphites have been proposed as stabilizers for polyvinyl chloride resins, and are employed either alone or in conjunction with other stabilizing compounds, such as polyvalent metal salts of fatty acids and alkyl phenols. Such phosphite stabilizers normally contain alkyl or aryl radicals in sufficient number to satisfy the three valences of the phosphite, and typical phosphites are described in the patent literature, for example, W. Lesitner et al, U.S. Pat. Nos. 2,564,646 of Aug. 14, 1951, 2,716,092 of Aug. 23, 1955, and 2,997,454 of Aug. 2, 1961.

Organic phosphites have also been added as stabilizers in amounts of 0.01 to 1%, preferably 0.05% to 0.2% by weight, to high molecular weight polycarbonate plastics, for example the polycarbonate of 2,2'-bis(4-hydroxyphenyl) propane of molecular weight 10000 and up to over 50000 as disclosed by G. Fritz in U.S. Pat. No. 3,305,520 of Feb. 21, 1967.

A Hecker in U.S. Pat. No. 2,860,115 of Nov. 11, 1958 disclosed compositions of organic phosphites with metal salts of carboxylic acids usd in olefin polymers.

Phosphites are also employed in conjunction with other stabilizers such as a polyhydric phenol in the stabilization of polypropylene and other synthetic resins against degradation upon heating or ageing under atmospheric conditions. The polyhydric phenol is thought to function as an antioxidant in such combinations. Disclosures by R. Werkheiser, U.S. Pat. No. 2,726,226 of Dec. 6, 1975; I. Salyer et al, U.S. Pat. No. 2,985,617 of May 23, 1961; L. Friedman, U.S. Pat. No. 3,039,993 of June 19, 1962; W. Nudenberg, U.S. Pat. No. 3,080,338 of Mar. 5, 1963; C. Fuchsman, U.S. Pat. No. 3,082,187 of Mar. 19, 1963; H. Orloff et al, U.S. Pat. No. 3,115,465 of Dec. 24, 1963; A. Nicholson, U.S. Pat. No. 3,167,526 of Jan. 26, 1965; A. Hecker et al, U.S. Pat. Nos. 3,149,093 of Sept. 15, 1964, 3,244,650 of Apr. 5, 1966 ad 3,225,136 and 3,255,151 of June 7, 1966; C. Bawn, U.S. Pat. No. 3,352,820 of Nov. 14, 1967; D. Miller, U.S. Pat. No. 3,535,277 of Oct. 20, 1970; J. Casey, U.S. Pat. No. 3,586,657 of June 22, 1971; C. Abramoff U.S. Pat. No. 3,856,728 of Dec. 24, 1974; M. Minagawa, U.S. Pat. Nos. 3,869,423 of Mar. 4, 1975 and 3,907,517 of Sept. 23, 1975; and British Pat. Nos. 846,684, 851,670, and 866,883 are representative of stabilizer combinations including organic phosphites, polyhydric phenols, and other active ingredients.

The importance of organic phosphites as stabilizers for synthetic resins has led to the development of a large variety of special phosphites intended to provide improved stabilizing effectiveness and compatibility and ease of compounding with the resin and with other stabilizers commonly used. However, the phosphites which have been proposed have not been entirely successful, partly because of their complicated structure, which makes them costly to prepare, and partly because of their difficulty of preparation.

Among these special phosphites, L. Friedman, U.S. Pat. No. 3,047,608 of July 31, 1962 disclosed a class of biphosphites having the formulae

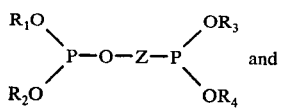

and

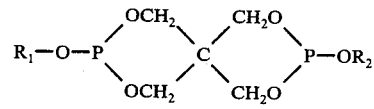

in which $R_1$, $R_2$, $R_3$ and $R_4$ are alkyl or aryl and Z is $-CH_2CH_2SCH_2CH_2O-$, $-C_2CH_2SO_2C_2CH_2-(-CH_2CH_2O-)_x$ or $(CHCH_3CH_2)_x$ where x is at least two, and in U.S. Pat. No. 3,053,878 of Sept. 11, 1962 a class of linear phosphite polymers having the formula

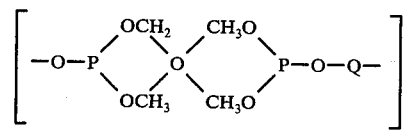

in which Q is the alkylene or arylene portion of a dihydric alcohol or dihydric phenol. R. Morris et al. in U.S. Pat. No. 3,112,286 of Nov. 26, 1963 disclosed phosphites having the formula

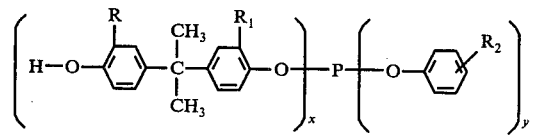

in which R represents a bulky hydrocarbon group such as t-butyl, t-amyl, t-hexyl, cyclohexyl, t-pentyl, t-octyl, phenyl, and the like; $R_1$ represents hydrogen and R; $R_3$ represents an alkyl group from 6 to 20 carbon atoms which is preferably in the meta or para position; x represents a number of from 1 to 3 inclusive; y represents a number of from 0 to 2 inclusive and the sum of the numerical value of $x+y$ is always exactly 3.

D. Brown, U.S. Pat. No. 3,297,631 of Jan. 10, 1967 disclosed condensation products of phosphorus compounds with bisphenols and trisphenols which may be represented by the structures:

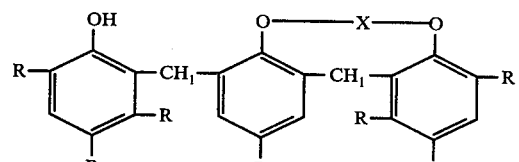

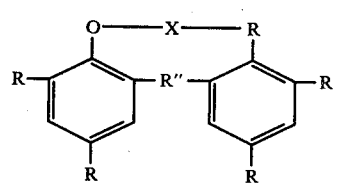

J. Floyd et al in German published application No. 2505071 of Aug. 14, 1975 abstracted in Chemical Abstracts 1976, Volume 84, abstract no. 5945f, disclosed low molecular weight polycarbonate esters of bisphenols such as 2,2-bis(3-t-butyl-4-hydroxyphenylpropane) and 4,4'-butylidene bis(6-t-butyl-3-methylphenol) prepared in such a way as to contain few or no free phenolic hydroxyl groups as being highly effective heat and light stabilizers for polyolefins and giving a synergistic effect with distearyl thiodipropionate, tris (nonylphenyl) phosphite, and distearyl pentaerythritoldiphosphite.

SUMMARY OF THE INVENTION

In accordance with this invention, the resistance of synthetic resins to deterioration when heated, as in processing or in accelerated aging tests, at 150° C and higher, is synergistically enhanced by incorporating in the resin a stabilizer composition comprising in combination (a) at least one organic phosphite having linked to phosphorus through oxygen at least two alkyl groups having from 6 to 20 carbon atoms and at least one organic group selected from polycyclic polyhydric phenol group and pentaerythritol groups, and (b) at least one carbonate ester of an ortho-substituted polyhydric phenol having in the molecule one to three benzenoid rings, two to three phenolic hydroxyl groups, and in each benzenoid ring one to two alkyl, aryl, cycloalkyl, aralkyl, or alkaryl groups of which at least one is positioned ortho to a phenolic hydroxyl group. Very small amounts of the stabilizer composition are effective, ranging from 0.002 to 10 parts by weight of the stabilizer composition for 100 parts by weight of the resin being stabilized and from 0.001 to 5 parts by weight of each of the essential ingredients. The preferred properties of the essential organic phosphite and carbonate ester ingredients of the stabilizer composition are in the range from 5 to 1 to 1 to 2.

DESCRIPTION OF THE PREFERRED EMBODIMENTS

The organic phosphite is characterized by certain essential structural features necessary for the synergistically enhanced stabilizing effectiveness in the stabilizer composition of this invention. These features are at least two alkyl groups of 6 to 20 carbon atoms linked to phosphorus through oxygen, and one or more pentaerythrityl groups or polycyclic polyhydric phenol groups. The organic phosphite component of the stabilizer composition of this invention can have one or more than one phosphite ester group in the molecule. The two or more alkyl groups in the organic phosphite can be linked through oxygen to a single phosphorus atom or to different phosphorus atoms when more than one phosphorus atom is present in the organic phosphite. The linkage of alkyl groups to phosphorus through oxygen can be direct as in $R_3$—O—P or through a phenylene groups as in $R_3C_6H_4$13 O—P where $R_3$ represents an alkyl group having 6 to 20 carbon atoms. Economically available alkyl groups include n-hexyl, 2-methyl-2-pentyl, 4-methyl-2-pentyl, 3-ethyl-3-pentyl, trimethylbutyl, n-octyl, 2-ethyljhexyl, isooctyl (from OXO process alcohol), 3,4- and 3,5-dimethylhexyl, 2,2,4-trimethyl-1-pentyl, 2,2,4-trimethyl-2-pentyl, 1-nonyl, nonyl from propylene trimer, isodecyl (from OXO process alcohol), 3,5,5 -trimethylhexyl, n-dodecyl from propylene tetramer, 2-butyloctyl, isotridecyl (from OXO process alcohol), 1-tetradecyl, mixed $C_{11}$ to $C_{15}$ secondary alkyl from paraffin oxidation, 1-hexadecyl, 1-octadecyl, behenyl, and "wax cracking" mixed alkyl.

Each polycyclic polyhydric phenol group in the organic phosphite is derived from a polycyclic polyhydric phenol and can be attached to one or to more than one phosphite ester group in the molecule, and has two to three phenolic benzenoid rings linked together by a divalent or trivalent hydrocarbon radical respectively. The hydrocarbon linking radical can be open-chain or cyclic and can have from 1 to about 20 carbon atoms. The linking groups can be alkylene, alkylidene, arylene, cycloalkylene, cycloalkylidene. Economically available linking groups include methylene, n-butyl-idene, isobutylidene, benzylidene, cyclohexylidene, 1,1,3-propane-triyl, 1,1,3-butanetriyl, 1,3,3-butanetriyl, 2,4,6-trimethylmesitylenetriyl, and dicyclopentadienediyl. Each of the phenolic benzenoid rings carries four substituents which can be hydrogen, or alkyl having 1 to about 10 carbon atoms. Substitution with one to two alkyl groups is preferred.

The pentaerythrityl group in the organic phosphite is derived from pentaerythritol and can be linked to one or more than one phosphite ester group in the molecule.

A preferred group of phosphites particularly effective in the stabilizer composition of this invention is defined by the formula $(R_3(C_6H_4)_aO)_bP(O)_{3-b}Z$ in which independently at each occurrence $a$ is zero or one, $b$ is one or two, $R_3$ is an alkyl group having from 6 to 20 carbon atoms, and when $b$ is two, Z is —ArX$_2$ArOA$_2$ where Ar is a carbocyclic aromatic nucleus, $X_2$ is selected from the group consisting of a divalent saturated hydrocarbon radical and

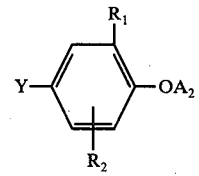

where Y is a trivalent saturated hydrocarbon radical and $A_2$ is selected from the group consisting of hydrogen and $P(O(C_6H_4)_aR_3)_2$, and when $b$ is one, Z is one

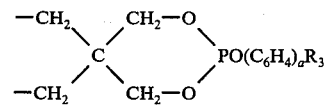

group or two ArX$_2$ArOA$_2$ groups, in at least one of which $A_2$ is $P(O(C_6H_4)_aR_3)_2$.

Each of the substituents on the Ar carbocyclic nucleus can be hydrogen or alkyl of 1 to 10 carbon atoms.

Representative organic phosphites that can be used in the stabilizer compositions of this invention include the following:

Phosphites with at least two alkyl groups and a polycyclic polyhydric phenol group Di-n-hexyl 4,4'-isopropylidenediphenol phosphite
Di-isodecyl 4,4'-butylidene bis (2-t-butyl-5-methylphenol) phosphite.
Didodecylphenyl 4,4'-cyclohexylidenebisphenol phosphite.
Dilauryl 1,1,3-tris(2'-methyl-4'-hydroxy-5'-t-butylphenyl) butane phosphite.

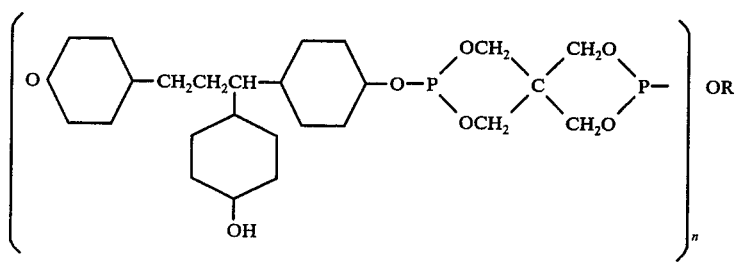

where R is alkyl, alkenyl, aryl, aralkyl, haloaryl, haloalkyl or

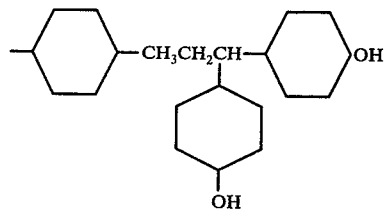

and $n$ is an integer of at least 1. $n$ can be 2,3,4,5,6,7, 8,10,50,100 or even more.

D. Bown et at. in U.S. Pat. Nos. 3,510,507 of May 5, 1970 and 3,691,132 of Sept. 12, 1972 disclosed polyolefins stabilized with polyphosphites, polyphosphates, polyphosphonites, polyphosphonates, polyborates, polycarbonates, and polysilanes which are condensation products of a 4,4'-bisphenol with a condensing or linking agent which may be of the ester type, such as the esters of triaryl or mixed aryl-alkyl compounds, or the acid halide type. Bown's condensation product stabilizers have molecular weights between 600 and 8000 or higher and are described by the structural formula,

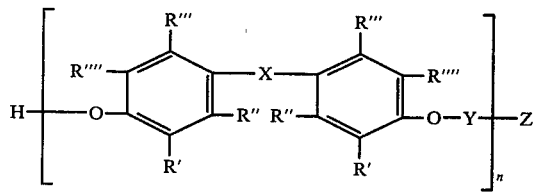

where X is selected from the group consisting of

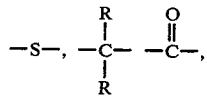

—C—C, and C—A—C— where A is a $C_1$ to $C_{16}$ alkylene or an arylene; R', R", R''', and R'''' are selected from the group consisting of hydrogen, $C_1$ to $C_{18}$ alkyls, and an aryl group; Y is selected from the group of

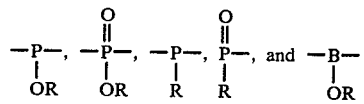

where R is hydrogen, a $C_1$ to $C_{18}$

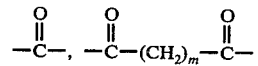

where $m$ is 0 to 10, preferably 4 to 8,

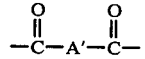

where A' is $(CH_2)_n$—S—$(CH_2)_n$ or —$(CH_2)_n$—S—$(CH_2)_m$— S-$(CH_2)_n$ where $n$ is 0 to 10, preferably 2 and $m$ is 0 to 10, preferably 5;

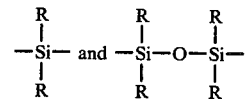

where R is an alkyl, preferably methyl, and Z is

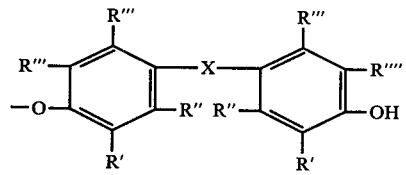

where R', R", R''', R'''', and X correspond respectively to the R', R", R''', R'''', and X previously selected when $n$ has a value from 1 to 15, or may be derived from the compound used to introduce Y into the product when $n$ has a value from 2 to 15, for example —R or —OR where R is hydrogen, an alkyl, or aryl. When Y in the formula of Bown's stabilizer is

the stabilizer is a type of hydroxyaryl phosphite. Similarly, when Y in the formula is

the stabilizer is a hydroxyaryl carbonate.

Bown's condensation products are described as especially effective in high molecular weight solid polyolefins when used together with a dialkyl sulfide costabilizer such as dilauryl thiodipropionate, distearyl thiodipropionate, ditridecyl thiodipropionate, dicetyl sulfide, bis(tetradecylmercapto) paraxylylene, and 10,24-dithiotetracontane.

Diheptadecyl 2,2-bis(3'isopropyl-4'-hydroxyphenyl)butane phosphite
Tetrakis (p-t-octylphenyl) 4,4'-benzylidenebis(2-t-amylphenol) diphosphite.
Tetrakis (isooctyl) 2,2'-methylenebis(4-t-octylphenol) diphosphite.
Diheptylphosphito-4,4'-isopropylidenebisphenol bis('-'wax-alkyl" phenyl) phosphite.
Hexakis(isodecyl) 1,1,3-tris(2',5'-dimethylphenyl) propanetriphosphite.
Isodecyl di(4,4'-butylidenebis(2-t-butyl-5-methylphenyl)diisodecyl phosphite.
Dodecylphenyl di(4,4'-methylenebis(2,3,5-trimethylphenyl)di(dodecylphenyl)phosphite) phosphite.

Phosphites with at least two alkyl groups and a pentaerythrityl group

Di-n-heptyl pentaerythritol diphosphite
Di-p-octylphenyl pentaerythritol diphosphite
Nonylphenyl 2-ethylhexyl pentaerythritol diphosphite
Diisodecylphosphitomethyl trimethylolmethanephosphite
4-methyl-2-pentyl eicosanyl pentaerythritol diphosphite
Pentaerythritol tetrakis (di(heptylphenyl) phosphite)
Pentaerythritol tetrakis (dinonyl phosphite)

Phosphites with at least two alkyl groups, a pentaerythrityl group, and a polycyclic polyhydric phenol group 4,4'-isopropylidenebisphenol bis (n-octadecyl pentaerythritol phosphite)
Di(nonylphenylphosphite(-4,4'-isopropylidenebis (2'-t-butylphenyl)butanetris(n-dodecyl pentaerythritol diphosphite)

A particularly preferred group of organic phosphites of especially great effectiveness in the stabilizer composition of this invention includes di-n-octadecyl pentaerythritol diphosphite, dinonylphenol 4,4'-isopropylidenebis(2-t-butylphenol) phosphite, tetrakis $(C_{12}-C_{15}$ primary alkyl) 4,4'-isopropylidenediphenol diphosphite, tetratridecyl 4,4'-butylidenebis(2-t-butyl-5-methylphenol diphosphite, and hexakis(tridecyl) 1,1,3-tris(2'methyl-4'-hydroxy-5'-t-butylphenyl)butane triphosphite.

Organic phosphites used in the stabilizer composition of this invention can be prepared by conventional methods by the reaction of a phosphorylating agent such as phosphorus trichloride or triphenyl phosphite with the desired alcohol and alkylphenol source of two alkyl groups and polycyclic polyhydric phenol and pentaerythritol as required in one or several reaction stages. Acid acceptors such as ammonia and organic amines can be used with phosphorus trichloride and alkaline transesterification catalysts can facilitate the reaction of triphenyl phosphite.

Useful preparative techniques can be found in the disclosures of U.S. Pat. Nos. 3,047,608; 3,058,878; 3,112,286; 3,305,608 and 3,476,699.

The carbonate ester is a carbonate of a dihydric or trihydric phenol characterized by certain essential structural features necessary for the synergistically enhanced stabilizing effectiveness in the stabilizer composition of this invention. These features are a controlled molecular weight in a range such that the carbonate ester is low in volatility and still sufficiently mobile in the polymer being stabilized for optimum effectiveness, which corresponds to a molecular weight range from 400 to about 4000; and in each benzenoid ring of the esterified dihydric or trihydric phenol one to two alkyl, cycloalkyl, or aralkyl groups having 1 to 10 carbon atoms of which at least one is positioned ortho to a phenolic hydroxyl group which can be a free hydroxyl or a carbonate ester. These recited features are critical to the observed effectiveness and in their absence the desired effectiveness in the stabilizer composition with the organic phosphite according to this invention is not obtained. For reasons that are not well understood the greatest stabilizing effectiveness in the composition of this invention is associated with carbonate esters having an odd number of benzenoid rings in the dihydric or trihydric phenol.

A preferred class of carbonate ester components of the stabilizer composition of this invention is derived from ortho-substituted 1,3- and 1,4- dihydric phenols having one benzenoid ring such as 2,5-di-t-butylhydroquinone, 2,3,6-trimethylhydroquinone, 2-methylresorcinol, and 2,6-di-t-butylresorcinol.

Also useful carbonate ester components of the stabilizer composition are carbonate esters of ortho-substituted bisphenols having two ortho-substituted phenolic groups linked directly or through a two valent hydrocarbon group such as 2,2'-methylene bis(4-methyl-6-t-butyl-phenol), 2,2'-methylene bis(4-ethyl-6-t-butylphenol), 2,2'-methylene bis(4-methyl-6-(1-methylcyclohexyl) phenol), 2,2'-n-butylidene bis(4,6-dimethylphenol), bis-1,1-(2'-hydroxy-3'5'-dimethylphenyl)-3,5,5-trimethylhexane, 2,2'-cyclohexylidene bis(4-ethyl-6-t-butylphenol), 2,2'-isopropylbenzylidene bis (4-ethyl-6-t-butylphenol), 4,4'-bis(2,6-di-t-butylphenol), 4,4'-methylene bis(2-methyl-6-t-butylphenol), 4,4'-methylene bis (2,6-di-t-butylphenol), 4,4'-isopropylidene bis(2-phenylethylphenol), 4,4'-n-butylidene bis(3-methyl-6-t-butylphenol), 4,4'-cyclohexylidene bis(2-t-butylphenol), 4,4'-cyclohexylidene bis (2-cyclohexylphenol), and 4,4'-benzylidene bis(2-t-butyl-5-methylphenol).

Another preferred class of carbonate esters that can be used in the composition of this invention is the class of carbonate esters of ortho-substituted bisphenols having two ortho-substituted phenolic groups linked through oxygen or sulfur, such as 4,4'-oxobis(3-methyl-6-isopropylphenol), 4,4'-thiobis(2-methyl-6-t-butylphenol), 4,4'-thiobis (3-methyl-6-t-butylphenol), 4,4'sulfobis(3-methyl-6-t-butylphenol), bis(2-methyl-4-hydroxy-5-t-butylbenzyl) sulfide, bis(3,5-di-t-butyl-4-hydroxy benzyl) sulfide, 2,2'-thiobis(4-t-butyl-6-methylphenol), 2,2'-thiobis(4-methyl-6-t-butyl-phenol), and 2,2'-thiobis(4,6-di-t-butylphenol).

A particularly preferred class of carbonate ester components of the stabilizer composition is the class of carbonate esters of ortho-substituted trisphenols having three ortho-substituted phenolic groups, such as 1,1,3-tris(2'-methyl4'-hydroxy-5'-t-butylphenyl)butane, 1,3,5-tris(3',5'-di-t-butyl-4'-hydroxybenzyl)-2,4,6-trimethylbenzene, 2,2-bis(3'-t-butyl-4'-hydroxyphenyl)-4-(3",5"-di-t-butyl-4"-hydroxyphenyl)butane, and 2,2-bis(2'-methyl-5'-t-butyl-4'-hydroxyphenyl)-4-(3",5"-di-t-butyl-4"-hydroxyphenyl) butane.

The most preferred group of carbonate esters used in stabilizer compositions of this invention is defined by the formula

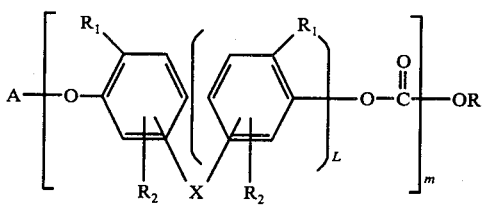

in which independently at each occurrence $R_1$ is selected from the group consisting of alkyl, cycloalkyl or arylalkyl radicals, $R_2$ is selected from the group consisting of hydrogen and $R_1$, and A is selected from the group consisting of hydrogen and

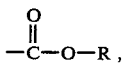

R is selected from the group consisting of alkyl, aryl, alkaryl, aralkyl, cycloalkyl and

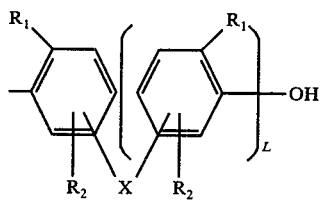

groups, X is selected from the group consisting of —S—,

—CH$_2$SCH$_2$—, and

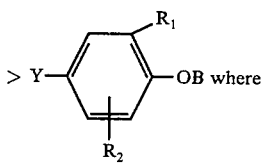

where

Y is a trivalent hydrocarbon radical,

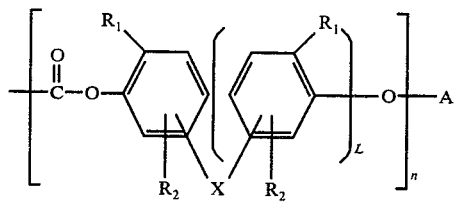

L is 0 or 1, $m$ is 1 to about 20, and $n$ is an average of 0.1 to about 20.

Alkyl groups $R_1$, and $R_2$ have 1 to 10 carbon atoms; cycloalkyl $R_1$ and $R_2$ groups have 5 to 10 carbon atoms and aralkyl groups $R_1$ and $R_2$ have 7 to 10 carbon atoms.

Carbonate esters used in the stabilizer composition of this invention can be prepared by conventional methods by the reaction of a carbonylating agent such as phosgene, a chloroformate ester, a dialkyl carbonate or a diaryl carbonate with the desired orthosubstituted dihydric or trihydric phenol in one or several reaction stages. Acid acceptors such as ammonia, pyridine, organic amines, and inorganic alkalies can be used with phosgene and chloroformate esters, and acidic or alkaline transesterification catalysts can facilitate the reaction of alkyl and aryl carbonate esters. The molecular weight of the carbonate ester is regulated by the proportions of carbonylating agent to ortho-substituted dihydric or trihydric phenol. Thus the product of the reaction between two moles of a dihydric phenol and one mole of carbonylating agent is a relatively low molecular weight mixture of carbonate esters in which the bis(hydroxyaryl carbonate) of the dihydric phenol predominates, and the product of the reaction between two moles of a carbonate ester carbonylating agent (e.g. diphenyl carbonate) and one mole of dihydric phenol is a relatively low molecular weight mixture of carbonate esters in which the dihydric phenol bis(phenyl carbonate) ester predominates. The more closely the proportions of carbonylating agent and dihydric or trihydric phenol approach one equivalent of each reactant the higher the molecular weight of the resulting product. In polycarbonates prepared with an excess of the dihydric or trihydric phenol reactant over the carbonylating agent the polycarbonate is predominantly terminated by hydroxyaryl groups while in polycarbonates prepared with an excess of the carbonylating agent over the phenol carbonate ester termination predominates. The hydroxyaryl terminated polycarbonates of average molecular weight ranging from 400 to about 4000 are preferred.

Useful preparative techniques for carbonate esters derived from polyhydric phenols can be found in the disclosures of U.S. Pat. Nos. 3,000,849; 3,028,365 and 3,510,507, as well as the review by L. Bottenbruch in "Encyclopedia of Polymer Science and Technology" (N. Bikales, ed.) Volume 10, pages 714–725 (J. Wiley-Interscience Publishers, New York 1969). Synthetic resins that can be stabilized with compositions comprising an organic phosphite and a carbonate ester according to this invention include alphaeolefin polymers such as polyethylene, polypropylene, polybutene, poly-3-methylbutene, or copolymers thereof such as ethylene-vinylacetate copolymer ethylenepropylene copolymer, polystyrene, polyvinylacetate, arylic ester resins, copolymers from styrene and another monomer (for example, maleic anhydride, butadiene, acrylonitrile and so on), acrylonitrile-butadiene-styrene copolymer, acrylic acid esterbutadiene-styrene copolymer, methacrylic acid ester-butadiene-styrene copolymer, methacrylate ester resin such as polymethylacrylate, polyvinylalcohol, ethylene and butylene, terephthalate polyesters, polyamide, polycarbonate, polyacetal, polyurethane, cellulosic resin, or phenolic resin, urea resin, melamine resin, epoxy resin, unsaturated polyester, silicone resin, halogen-containing resins such as polyvinyl chloride, polyvinylidene chloride, polyvinylidene fluoride and copolymers thereof, and further rubbers such as isoprene rubber chloroprene rubber, and blends of the above resins.

Stabilizer compositions comprising an organic phosphite and a carbonate ester according to this invention can be formulated and marketed in liquid, solid, and paste forms. An inert solvent can be used to facilitate

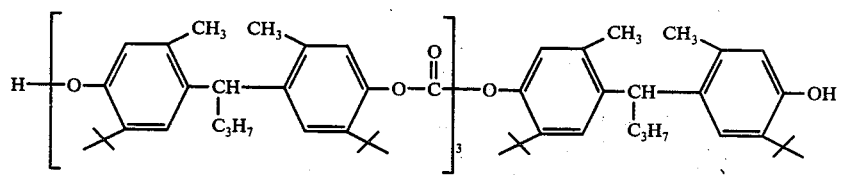

Approximate molecular weight 1500

Carbonate ester 9: Bis(2-methyl-4-hydroxy-5-t-butylbenzyl) sulfide/diphenyl carbonate, 8:7 molar ratio

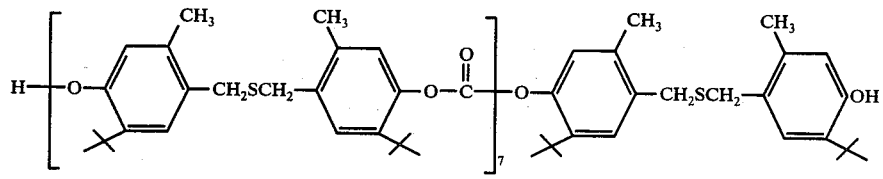

Carbonate ester 6: 4,4′-Butylidenebis(2-t-butyl-5-methylphenol)/diphenyl carbonate, 6:5 molar ratio Approximate molecular weight 2400

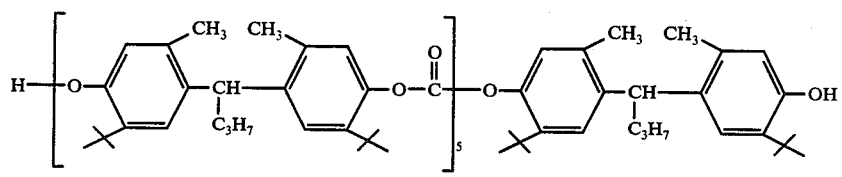

Approximate molecular weight 2300

Carbonate ester 10: Bis(2-methyl-4-hydroxy-5-t-butylbenzyl) sulfide/diphenyl carbonate, 4:3 molar ratio

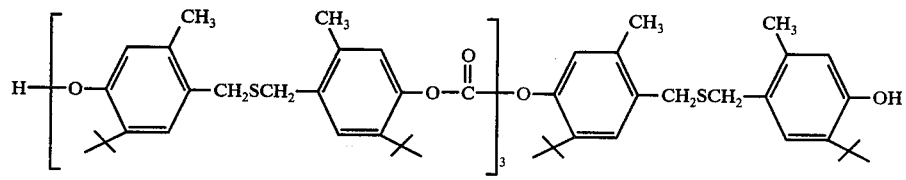

Carbonate ester 7: 4,4′-Thiobis(2-t-butyl-5-methylphenol)/diphenyl carbonate, 4:3 molar ratio Approximate molecular weight 1600

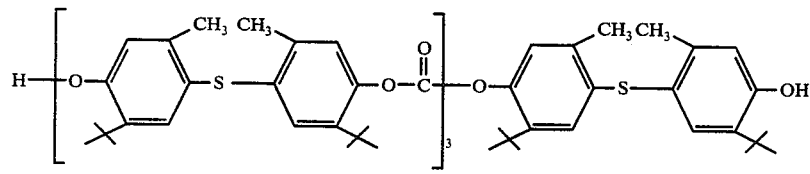

Approximate molecular weight 1500

Carbonate ester 8: 4,4′-Thiobis(2-t-butyl-5-methylphenol)/diphenyl carbonate, 2:3 molar ratio Carbonate ester 11: 4,4′-Cyclohexylidenbis (2-cyclohexylphenol)/diphenyl carbonate, 5:4 molar ratio

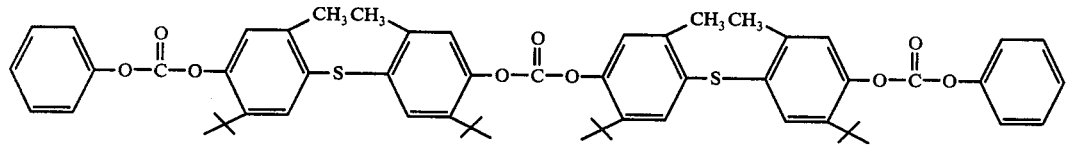

Approximate molecular weight 1000 handling. The organic phosphite and carbonate ester can also be solubilized in one another by heating, such as at 70°–160° C. for up to 4 hours, and then allowing the resulting melt to cool and harden sufficiently to be flaked and ground.

Known polymer stabilizers can be used in synthetic resin compositions together with the stabilizer compositions of this invention and can be admixed with the latter. Such known stabilizers include thiodipropionic acid esters, polyvalent metal salts of carboxylic acids, and 1,2-epoxides. Representative thiodipropionic acid esters include di-n-dodecyl thiodipropionate, dihexadecyl thiodipropionate, distearyl thiodipropionate, n-octyl eicosanyl thiodipropionate and n-octadecyl cyclohexane-1,4-dimethanol thiodipropionate polyester. A comprehensive disclosure of useful thiodipropionate esters by M. Minagawa et al in U.S. Pat. No. 3,869,423, column 17 line 55 to column 19 line 54 is here incorporated by reference.

Representative polyvalent metal salts include zinc, calcium, magnesium, barium, strontium and nickel salts of monocarboxylic acids having 6 to 24 carbon atoms, for example zinc benzoate, calcium palmitate, and nickel 2-ethylbutyrate. A comprehensive disclosure of useful metal salts by M. Minagawa et al in U.S. Pat. No. 3,869,423, column 19 line 56 to column 20 line 35 is here incorporated by reference.

Representative 1,2-epoxides include epoxysoybean oil, epoxylinseed oil, and 2-ethylhexyl epoxystearate. A comprehensive disclosure of 1,2-epoxides by M. Minagawa et al in U.S. Pat. No. 3,869,423 column 26 line 13 to line 39 is here incorporated by reference.

The preparation of the stabilized resin composition is easily accomplished by conventional procedures. A heated two roll mill, for example, is a convenient compounding tool for blending stabilizer compositions of the invention with polyolefins, vinyl chloride polymers, ABS polymers, ethylene-vinyl acetate copolymers and others.

In the examples that follow, phosphites used in stabilizer compositions according to this invention are designated by letters as follows:

A: 4,4'-Isopropylidene bis(2-t-butylphenol)·di(nonylphenyl)phosphite.
B: 4,4'-Isoproylidenediphenol·tetraalkyl (C$_{12-15}$) diphosphite
C: 4,4'-n-Butylidene bis(3-methyl-6-t-butylphenol)·tetra(tridecyl) diphosphite
D: Pentaerythritol bis(-n-octadecyl phosphite)
E: 1,1,3-Tris(2'-methyl-4'-hydroxy-5'-t-butylphenol) butane. hexa(tridecyl)triphosphite Carbonate esters used in stabilizer compositions according to this invention are designated by numbers followed by structural formulae and average molecular weight as well as the nature and molecular proportions of carbonylating agent and polyhydric phenol used in their preparation, as shown in Table 1.

TABLE 1

Carbonate Ester Stabilizers

Carbonate ester 1: 2,5-Di-t-butylhydroquinone/diphenyl carbonate, 8:7 molar ratio

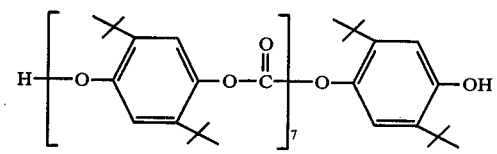

Approximate molecular weight 2100

Carbonate ester 2: 2,5-Di-t-butylhydroquinone/diphenyl carbonate; 9:10 molar ratio

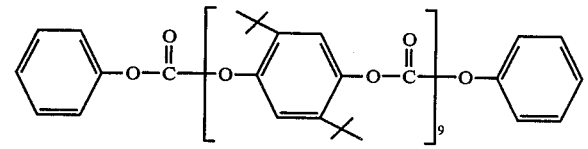

Approximate molecular weight 2400

Carbonate ester 3: 4,4'-Methylenebis(2-t-butyl-6-methylphenol)/diphenyl carbonate, 3:2 molar ratio

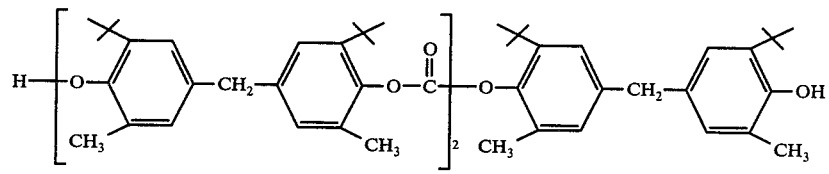

Approximate molecular weight 110

Carbonate ester 4: 4,4'-Butylidenebis(2-t-butyl-5-methylphenol)/diphenyl carbonate, 2:1 molar ratio

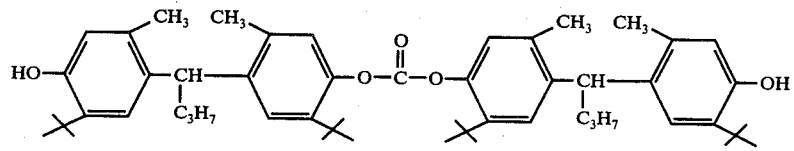

Approximate molecular weight 700

Carbonate ester 5: 4,4'-Butylidenebis(2-t-butyl-5-methylphenol)/diphenyl carbonate, 4:3 molar ratio Carbonate ester 18: 1,1,3-Tris(2'-methyl-4'-hydroxy-5'-t-butylphenyl)butane/diphenyl carbonate, 2:1 molar ratio

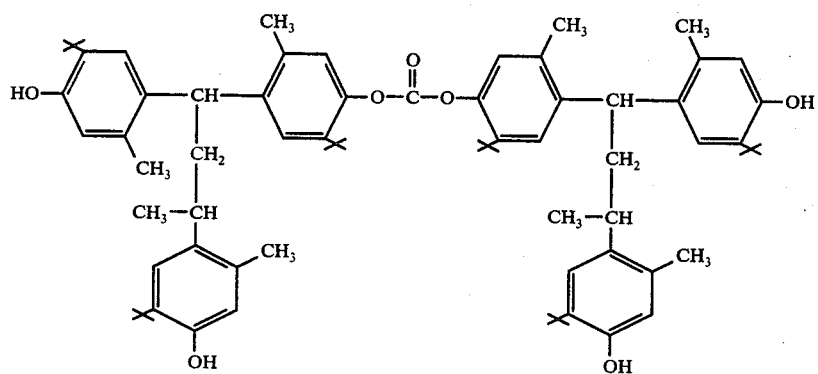

Approximate molecular weight 1100

Carbonate ester 19: 1,1,3-Tris(2'-methyl-4'-hydroxy-5'-t-butylphenyl)butane/diphenyl carbonate, 5:4 molar ratio

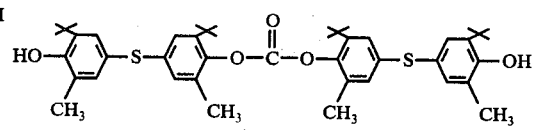

Approximate molecular weight 700

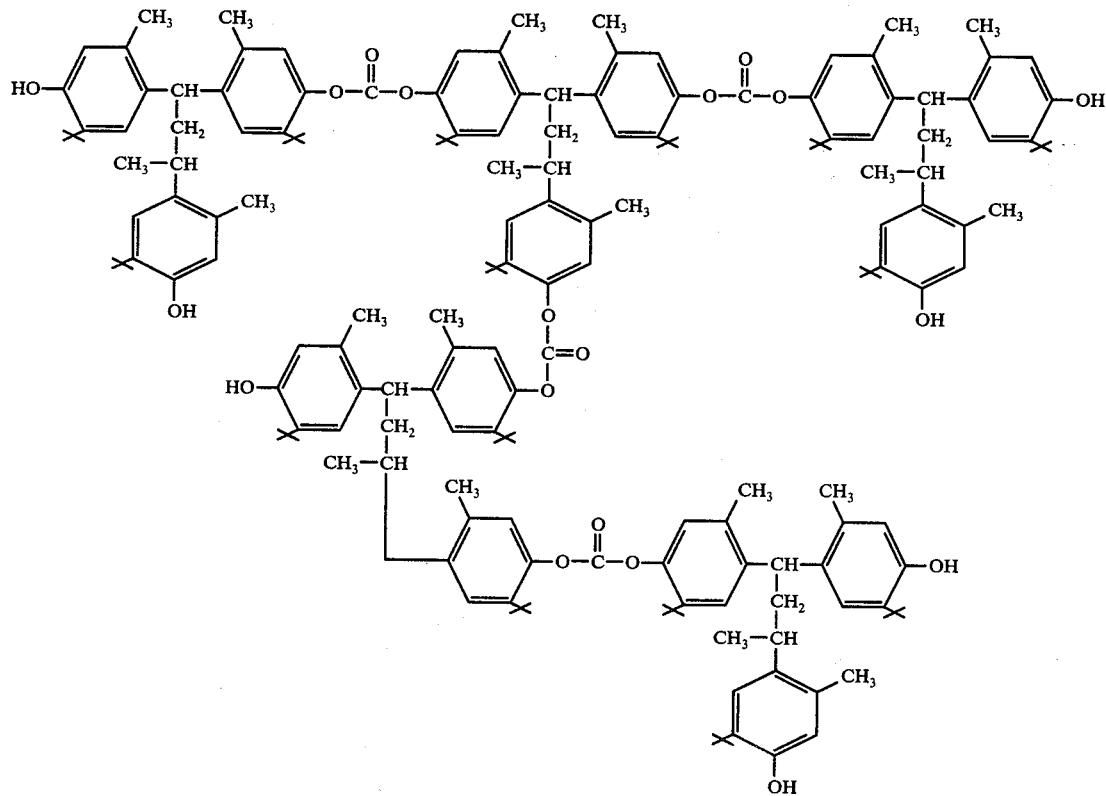

Approximate molecular weight 2700

Carbonate ester 20: 4,4'-Thiobis(2-t-butyl-6-methylphenol/diphenyl carbonate, 2:1 molar ratio Carbonate ester 21: 4,4'-Butylidenebis(2-t-butyl-5-methylphenol/ 4,4'-thiobis(2-t-butyl-5-methyl)phenol bischloroformate, 3:2 molar ratio

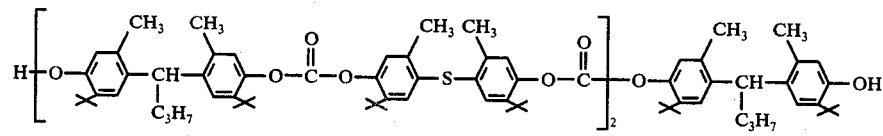

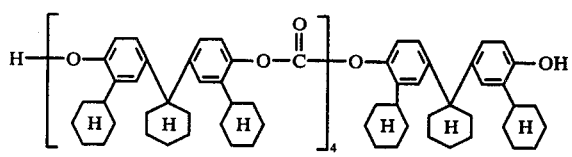

Approximate molecular weight 2300

Carbonate ester 12: 4,4'-Cyclohexylidenebis(2-cyclohexylphenol)/diethyl carbonate, 5:6 molar ratio

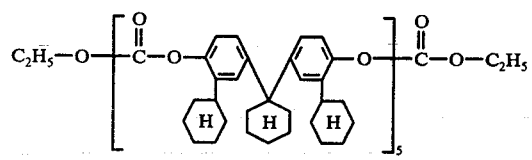

Approximate molecular weight 2400

Carbonate ester 13: 2,2'Methylenebis(4-methyl-6-t-butylphenol)/diphenyl carbonate, 3:2 molar ratio

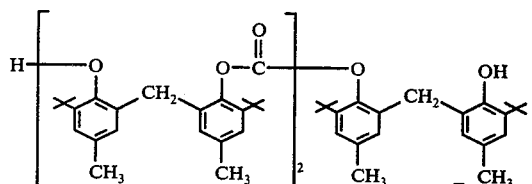

Approximate molecular weight 1100

Carbonate ester 14: 2,2'-Methylenebis(4-methyl-6-t-butylphenol)/diphenyl carbonate, 6:5 molar ratio

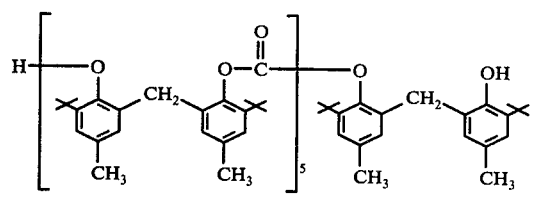

Approximate molecular weight 2200

Carbonate ester 15: 1-(3',5'-Di-t-butyl-4'-hydroxyphenyl)-3,3-di-(3'-t-butyl-4'-hydroxyphenyl) butane/diphenyl carbonate, 2:1 molar ratio

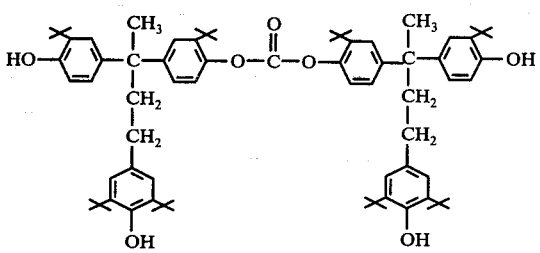

Approximate molecular weight 1100

Carbonate ester 16: 1-(3','-Di-t-butyl-4'-hydroxyphenyl)-3,3-di-(3'-t-butyl-4'-hydroxyphenyl)butane/diphenyl carbonate, 4:3 molar ratio

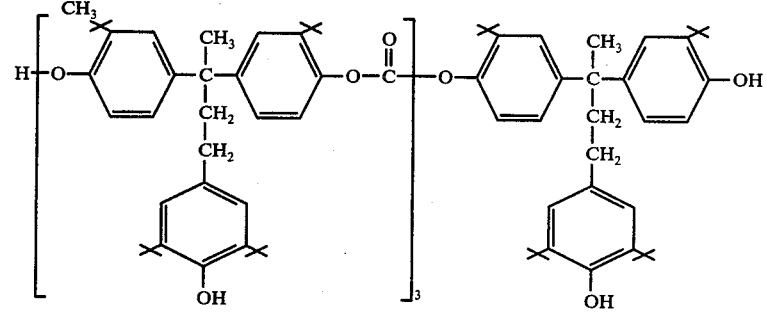

Approximate molecular weight 2200

Carbonate ester 17: 1-(3',5'-Di-t-butyl-4'-hydroxyphenyl)-3,3-di-(3'-t-butyl-4'-hydroxyphenyl)butane/diphenyl carbonate, 8:7 molar ratio

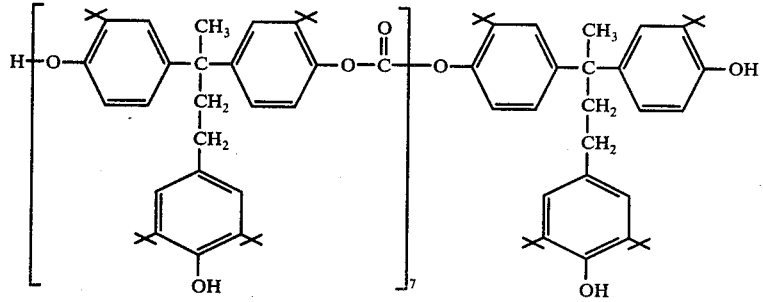

Approximate molecular weight 3700

Approximate molecular weight 2000

EXAMPLES 1 TO 10

In order to examine the stabilizing effect of stabilizer compositions according to this invention, un-stabilized polypropylene resin 100 parts by weight, an organic phosphite 0.15 part by weight and a carbonate ester or BHT antioxidant 0.1 part by weight were ground together for 10 minutes at room temperature. This mixed powder blend was kneaded on a two roll mill at 180° C for six minutes and from the mill stock a sheet of 1.0 mm in thickness was prepared by compression molding at 180° C and 200 kg/cm² for 5 minutes. Each molded sheet was cut to the size of 40=150 mm, and suspended in an individual glass cylinder.

Each cylinder was set in an air circulating oven at 160.5° C, flushed with pure oxygen, the pressure adjusted to one atmosphere, and the cyclinder fitted with a closed manometer. The time to beginning of oxidation-degradation was read by recording the time when the pressure in the cylinder diminished rapidly. The ingredients of the stabilizer combination used in each example and the results observed are shown in Table 2.

TABLE 2

| Control | Ingredient A | Ingredient B | Time to Begin Degradation (hours) |
|---|---|---|---|
| I | Tris(nonylphenyl) phosphite | BHT anti-oxidant | 18 |
| II | Tris(nonylphenyl) phosphite | Carbonate ester No. 4 (from Table 1) | 37 |
| III | (None) | Carbonate ester No. 7 | 29 |
| IV | Phosphite B | BHT anti-oxidant | 24 |
| V | Phosphite D | (None) | 20 |

| Example | Organic Phosphite | Carbonate Ester (Table 1) | Time to Begin Degradation (hours) |
|---|---|---|---|
| 1 | A | NO. 19 | 121 |
| 2 | B | NO. 4 | 145 |
| 3 | C | NO. 5 | 113 |
| 4 | D | NO. 7 | 128 |
| 5 | E | NO. 15 | 117 |
| 6 | A | NO. 3 | 124 |
| 7 | B | NO. 18 | 130 |
| 8 | C | NO. 20 | 137 |
| 9 | D | NO. 16 | 133 |
| 10 | E | NO. 1 | 108 |

The results of these experiments demonstrate the synergistic interaction of the organic phosphite and the carbonate ester in the combination according to this invention. The observed times to the beginning of degradation as shown by a drop in oxygen pressure are far greater for the combinations of Examples 1 to 10 than for a carbonate ester alone (Control III), a combination of the carbonate ester with a conventional phosphite not of the type selected for the combination of this invention (Control II), or Control I or Control IV. It is particularly noteworthy that, in combination with tris(-nonylphenyl)phosphite, carbonate ester No. 4 (Control II) is only marginally better than BHT antioxidant (Control I).

EXAMPLES 11 TO 19

Substantially unstabilized polypropylene resin (Profax 6501, containing a trace of BHT antioxidant to protect the polymer during shipment and storage only) 100 parts by weight, dilaurylthiodipropionate 0.2 part by weight, an organic phosphite 0.1 part and a carbonate ester (Table I) 0.1 part by weight were mixed for ten minutes by mixing and grinding at room temperature and milled and molded to make a sheet of 1.0 mm in thickness under the condition mentioned in Examples 1—10. This sheet was cut into ten sample pieces of 10 × 20 mm of each formulation, and exposed on aluminum foil in a Geer air-circulating oven at 160° C for heat stability examination. The time to the beginning of degradation was taken as the time when more than five sample pieces in ten of each formulation were discolored and brittle. The stabilizer ingredients used and the results obtained are shown in Table 3.

TABLE 3

| Control | Ingredient A | Ingredient B | Time to Begin Degradation (hours) |
|---|---|---|---|
| VI | Diphenyl decyl phosphite | 4,4'-butylidenebis (2-t-butyl-5-methyl phenol) | 460 |
| VII | Phosphite C | NONE | 230 |
| VIII | Phosphite E | Carbonate ester of 4,4'-isopropylidenediphenol, approx. mol. Wt. 1000 | 380 |
| IX | None | Carbonate ester No. 16 (Table 1) | 290 |
| X | Diphenyldecyl phosphite | Carbonate ester No. 18 | 570 |

| Example | Organic Phosphite | Carbonate Ester (Table 1) | Time to Begin Degradation (hours) |
|---|---|---|---|
| 11 | A | 2 | 1060 |
| 12 | B | 6 | 1180 |
| 13 | C | 11 | 1370 |
| 14 | E | 18 | 1310 |
| 15 | A | 9 | 1220 |
| 16 | B | 13 | 1240 |
| 17 | C | 16 | 1250 |
| 18 | D | 4 | 1350 |
| 19 | E | 21 | 1200 |

The observed times to the beginning of degradation as shown by becoming discolored and brittle are far greater for the combinations according to this invention than for the control samples that are lacking in one or the other essential ingredient, thus demonstrating the enhanced effectiveness of the stabilizer combinations according to this invention. The excellent results of Examples 14 and 19 contrast with Control VIII which contains a carbonate ester lacking the essential $R_1$ alkyl substituent required according to this invention.

EXAMPLES 20 TO 29

Stabilized polyethylene resin (Hi-Zex 5100E, Mistui Petrochemical Industries, Ltd. Japan) 100 parts by weight, an organic phosphite 0.1 part, a carbonate ester compound 0.05 part by weight were milled on a two roll mill for 5 minutes at 150° C and then molded into a sheet of 1.2 mm thickness by compression molding at 150° C and 180 kg/cm² for 5 minutes. The sheet was cut into sample pieces of 10 × 20 mm and tested for heat stability in the Geer oven at 148.5° C in air on aluminum foil. The time to the beginning of degradation was taken as the time when more than five sample pieces in ten of each formulation were discolored and brittle. The stabilizer ingredients used and the results obtained are shown in Table 4.

TABLE 4

| Control | Ingredient A | Ingredient B | Time to Begin Degradation (hours) |
|---|---|---|---|
| XI | Phosphite A | 4,4'-n-butylidenebis(2-t-butyl-5-methylphenol) | 315 |
| XII | Phosphite B | (NONE) | 237 |
| XIII | (NONE) | Carbonate ester No. 15 (Table 1) | 260 |
| XIV | Tri-isodecyl phosphite | Carbonate ester No. 3 | 304 |
| XV | Phosphite B | Carbonate ester of 4,4'-isopropylidenediphenol (see Table 3) | 253 |

| Example | Organic Phosphite | Carbonate Ester (Table 1) | Time to Begin Degradation (hours) |
|---|---|---|---|
| 20 | A | No. 7 | 470 |
| 21 | B | No. 10 | 485 |
| 22 | C | No. 3 | 511 |
| 23 | D | No. 15 | 467 |
| 24 | E | No. 12 | 454 |
| 25 | A | No. 14 | 502 |
| 26 | B | No. 5 | 475 |
| 27 | C | No. 17 | 466 |
| 28 | D | No. 21 | 483 |
| 29 | E | No. 4 | 497 |

The results of these tests demonstrate the surprisingly powerful protection obtained with combinations of organic phosphite and carbonate ester according to this invention, as compared to the relative ineffectiveness of individual ingredients or superficially similar combinations lacking an essential feature of this invention. The excellent results of Examples 20 to 29 contrast with control XV which contains a carbonate ester lacking the essential $R_1$ alkyl substituent required according to this invention; the carbonate of control XV provides almost no additional protection with phosphite B than phosphite B alone (Control XII).

EXAMPLES 30 TO 39

ABS resin (Blendex 111) 100 parts by weight, Zinc stearate 0.5 part by weight, titanium oxide 5.0 parts by weight, an organic phosphite 0.2 part and a carbonate ester 0.2 part by weight were mixed by grinding at room temperature for 10 minutes.

The compound was prepared by extruding the ground mixture using a 30 mm extruder at 30 rpm and 240° C. A sheet of 0.5 mm thickness was prepared by compression molding the compound at 200 kg/cm² and 180° C for 5 minutes. The heat stability test was carried out in the same way as examples 1–10 except that the test temperature was at 140° C.

The stabilizer ingredients used and the results obtained are shown in Table 5.

TABLE 5

| Control | Ingredient A | Ingredient B | Time to Begin Degradation (hours) |
|---|---|---|---|
| XVI | (none) | Carbonate ester No. 5 (Table 1) | 230 |
| XVII | Tris(nonylphenyl) phosphite | Carbonate ester No. 19 | 350 |
| XVIII | Phosphite C | (none) | 210 |
| XIX | Phosphite D | 1,1,3-tris(2'-methyl-4'-hydroxy-5'-t-butylphenyl)butane | 220 |

| Example | Organic Phosphite | Ester (Table 1) | Degradation (hours) |
|---|---|---|---|
| 30 | A | No. 10 | 570 |
| 31 | B | No. 2 | 550 |
| 32 | C | No. 6 | 600 |
| 33 | D | No. 19 | 650 |
| 34 | E | No. 9 | 610 |
| 35 | A | No. 17 | 620 |
| 36 | B | No. 20 | 660 |
| 37 | C | No. 8 | 570 |
| 38 | D | No. 5 | 620 |
| 39 | E | No. 13 | 590 |

The results of this experiment show the great synergistic effectiveness of the stabilizer compositions of this invention in ABS polymer.

The compositions according to the invention in Examples 30 to 39 are far better in stabilizing ABS polymer than a phosphite alone (Control XVIII), a carbonate ester used together with a phosphite not of this invention (Control XVII), or a conventional combination of a phenolic antioxidant with a phosphite not of this invention (Control XIX).

EXAMPLES 40 to 49

A clear sheet was prepared by kneading polyvinylchloride resin (Geon 103EP) 100 parts, dioctylphthalate 42 parts, epoxidized soybean oil 3, parts zinc stearate 0.3 part, barium stearate 0.5 part, stearic acid 0.3 part, an organic phosphite 0.2 part, and a carbonate ester 0.05 part on a two roll mill at 175° C for 5 minutes and then compression molding at 175° C. Then, a heat stability test was carried out in a Geer oven at 190° C in an air atmosphere. The time to degradation was determined by the discoloration observed. The organic phosphite and carbonate used and the results obtained are shown in Table 6.

TABLE 6

| Control | Ingredient A | Ingredient B | Time to Yellow Mins. | Time to Black Mins. |
|---|---|---|---|---|
| XX | (None) | Carbonate ester No. 6 (Table 1) | 40 | 50 |
| XXI | Phosphite A | n-octadecylbeta(3,5-di-t-butyl-4-hydroxyphenyl)propionate | 45 | 55 |
| XXII | Phosphite E | (None) | 40 | 45 |
| XXIII | Tris(nonylphenyl) phosphite | Carbonate ester No. 11 | 45 | 50 |

| Example | Organic Phosphite | Carbonate Ester (Table 1) | Time to Yellow | Time to Black |
|---|---|---|---|---|
| 40 | A | No. 11 | 65 | 90 |
| 41 | B | No. 1 | 60 | 80 |
| 42 | C | No. 4 | 65 | 85 |
| 43 | D | No. 14 | 60 | 80 |
| 44 | E | No. 6 | 70 | 90 |
| 45 | A | No. 15 | 60 | 80 |
| 46 | B | No. 3 | 55 | 80 |
| 47 | C | No. 12 | 70 | 85 |
| 48 | D | No. 18 | 65 | 80 |
| 49 | E | No. 20 | 65 | 90 |

The results show the unexpectedly large contribution to heat stability provided by the composition according to this invention. Thus phosphite A with carbonate ester 15 (Example 45) provides far greater stabilization than TO same phosphite used with a known phenolic antioxidant (Control XXI) usually considered highly effective.

EXAMPLES 50 to 59

100 parts of nylon 66 delustered by adding 0.05% of titanium dioxide was dissolved in 90 parts of 90% formic acid, and an organic phosphite 0.5 part and a carbonate ester 0.3 part were added and mixed completely. The solution was flowed uniformly on a glass plate, and dried in a heated air oven at 105° C for 10 minutes to prepare a film. The color of the film, after being heated in an air oven at 225° C for 30 minutes, was measured and shown in Table 7 along with the compounds present in each formulation.

TABLE 7

| Control | Ingredient A | Ingredient B | Color |
|---|---|---|---|
| XXIV | Tris(nonylphenyl) phosphite | Carbonate ester No. 1 (Table 1) | Yellow |
| XXV | Phosphite B | (None) | Light Brown |
| XXVI | Phosphite E | BHT antioxidant | Yellow |
| XXVII | (None) | Carbonate ester No. 10 | Light Brown |
| XXVIII | (None) | (None) | Dark Brown |

| Example | Organic Phosphite | Carbonate Ester (Table 1) | Color |
|---|---|---|---|
| 50 | A | No. 1 | Pale Yellow |
| 51 | B | No. 11 | Pale Yellow |
| 52 | C | No. 21 | Pale Yellow |
| 53 | D | No. 3 | Very Pale Yellow |
| 54 | E | No. 10 | Very Pale Yellow |
| 55 | A | No. 13 | Pale Yellow |
| 56 | B | No. 7 | Very Pale Yellow |
| 57 | C | No. 18 | Very Pale Yellow |
| 58 | D | No. 20 | Very Pale Yellow |
| 59 | E | No. 16 | Very Pale Yellow |

These experiments prove the unexpected superiority in protecting the color of the polyamide of combinations according to this invention over individual components or combinations lacking one or both of the essential components. Each polyamide sample of Examples 50 to 59 was lighter in color than any of the controls.

EXAMPLES 60 TO 68

In order to examine the effect of the stabilizer owing to this invention to polybutene resin, a sheet of 1 mm in thickness was prepared by kneading the following formulation on a two roll mill and then compression molding at 160° C and 200 kg/cm² for 5 minutes.

The sheet obtained was cut to the size of 40 × 150 mm, and tested for heat stability at 160° C in glass cylinders containing pure oxygen at 1 atmosphere pressure as in Examples 1–10.

| (Formulation) | Parts By Weight |
|---|---|
| Un-stabilized poly-1-butene resin | 100 |
| Calcium stearate | 1.0 |
| Distearylthiodipropionate | 0.1 |
| Organic phosphite | 0.1 |
| Carbonate ester | 0.1 |

The results are shown in Table 8. The time to beginning of oxidation degradation was read by recording the time when the pressure in the cylinder diminished rapidly.

TABLE 8

| Control | Ingredient A | Ingredient B | Time to Begin Degradation (hours) |
|---|---|---|---|
| XXIX | (None) | Carbonate ester of 4,4′-isopropylidene-diphenol (see Table 3) | 105 |
| XXX | Phosphite C | (None) | 120 |
| XXXI | Phosphite D | Carbonate ester of 4,4′-isopropylidene-diphenol (see Table 3) | 140 |
| XXXII | (None) | Carbonate ester No. 8 (Table 1) | 180 |
| XXXIII | Octyldiphenyl phosphite | Carbonate ester No. 17 | 230 |

| Example | Organic Phosphite | Carbonate Ester (Table 1) | Time to Begin Degradation (hours) |
|---|---|---|---|
| 60 | A | No. 8 | 485 |
| 61 | B | No. 9 | 510 |
| 62 | C | No. 2 | 450 |
| 63 | D | No. 17 | 535 |
| 64 | E | No. 5 | 555 |
| 65 | A | No. 21 | 520 |
| 66 | B | No. 15 | 545 |
| 67 | C | No. 14 | 490 |
| 68 | E | No. 19 | 560 |

These examples demonstrate the unexpectedly great stabilizing effectiveness of combinations of this invention in polybutene. The contrast between Example 63 and control XXXI, where phosphite D (the same as in Example 63) is used together with a carbonate ester lacking the essential $R_1$ alkyl group according to this invention is especially noteworthy.

EXAMPLES 69 TO 78

In order to examine the effects of the combinations according to this invention in ethylene-vinylacetate copolymer, samples were prepared according to the following formulations and tested for heat stability in a Geer oven at 175° C and initial color was measured for yellowness using the Hunter color difference meter, greater numbers indicating more severe discoloration.

The results are shown in Table 9. The heat stability is expressed in minutes of heating in the oven until a red or brown discoloration was observed.

| (Formulation) | parts |
|---|---|
| Ethylene-Vinylacetate copolymer resin | 100 |
| Montan wax ester lubricant | 0.3 |
| Organic phosphite | 0.1 |
| Carbonate ester | 0.05 |

TABLE 9

| Control | Ingredient A | Ingredient B | Time to Begin Degradation Mins. | Color |
|---|---|---|---|---|
| XXXIV | Tris(nonylphenyl) phosphite | Carbonate ester No. 13 (Table 1) | 105 | 14 |
| XXV | Phosphite A | BHT antioxidant | 105 | 16 |
| XXXVI | Phosphite B | (None) | 90 | 18 |
| XXXVII | (None) | Carbonate ester No. 20 | 90 | 19 |
| XXVIII | (None) | (None) | 75 | 33 |

| Example | Organic Phosphate | Carbonate Ester (Table 1) | Time to begin Degradation Mins. | Color |
|---|---|---|---|---|
| 69 | A | No. 4 | 165 | 7 |
| 70 | B | No. 8 | 150 | 9 |
| 71 | C | No. 15 | 150 | 8 |
| 72 | D | No. 1 | 135 | 10 |
| 73 | E | No. 3 | 150 | 10 |

TABLE 9-continued

| | | | | |
|---|---|---|---|---|
| 74 | A | No. 20 | 165 | 8 |
| 75 | B | No. 21 | 150 | 9 |
| 76 | C | No. 13 | 135 | 11 |
| 77 | D | No. 6 | 150 | 9 |
| 78 | E | No. 17 | 150 | 10 |

These experiments demonstrate the surprising advantages of stabilizer compositions according to this invention over compositions lacking one or both of the essential ingredients according to the invention.

EXAMPLES 79 TO 88

The stabilizer combinations according to this invention have an excellent stabilizing effect on crosslinked polyethylene. Unstabilized low density polyethylene (meltindex 2.0) 100 parts by weight, dilaurylthiodipropionate 0.1 part by weight, an organic phosphite 0.1 part, and a carbonate ester 0.1 part by weight were mixed by milling on a two roll mill at 110° C for 10 minutes and then dicumyl peroxide (Percumyl D, Nippon Oil and Fats Co., Ltd.) 2.0 parts by weight was added and further kneaded at the same temperature for two minutes. This sheet prepared on the mill was compression molded at 110° C and 100 kg/cm² for 5 minutes, then rapidly heated up to 180° C while maintaining the pressure at 100 kg/cm² for 15 minutes. The sheet obtained was cut to the size of 40 × 150 mm, hung in a Geer oven and tested for heat stability in air at 160° C. The degradation time was judged by looking for the time when more than 50% of pieces were discolored or deformed. The stabilizer ingredients used and the results obtained are shown in Table 10.

TABLE 10

| Control | Ingredient A | Ingredient B | Time to Begin Degradation (hours) |
|---|---|---|---|
| XXXIX | Phosphite C | 4,4'-thiobis (2-t-butyl-5-methylphenol) | 98 |
| XL | Tris(nonylphenyl) phosphite | Carbonate ester No. 4 (Table 1) | 114 |
| XLI | (None) | Carbonate ester No. 21 | 73 |
| XLII | Phosphite E | (None) | 65 |

| Example | Organic Phosphite | Carbonate Ester (Table 1) | Time to Begin Degradation (hours) |
|---|---|---|---|
| 79 | A | No. 5 | 158 |
| 80 | B | No. 16 | 163 |
| 81 | C | No. 3 | 179 |
| 82 | D | No. 7 | 166 |
| 83 | E | No. 8 | 162 |
| 84 | A | No. 18 | 174 |
| 85 | B | No. 4 | 185 |
| 86 | C | No. 15 | 180 |
| 87 | D | No. 20 | 157 |
| 88 | E | No. 21 | 169 |

The results of these test demonstrate the great stabilizing effectiveness in cross-linked polyethylene of the compositions according to the invention, which compare favorably to single stabilizers and to combinations of stabilizers not of this invention. Thus the phosphite C is used in Control XXXIX in combination with a phenolic antioxidant and in Examples 81 and 86 in combination with a carbonate ester according to this invention, and the latter combinations had nearly twice the heat stability as the control composition.

We claim:
1. A stabilizer composition useful in synergistically increasing the resistance of a synthetic resin to deterioration when heated at 150° C, comprising in combination (a) at least one organic phosphite having linked to phosphorus through oxygen at least two alkyl groups having from 6 to 20 carbon atoms and at least one organic group selected from polycyclic polyhydric phenol groups and pentaerythritol groups and (b) at least one carbonate ester of an orthosubstituted polyhydric phenol having an average molecular weight between 400 and 4000 and having the formula:

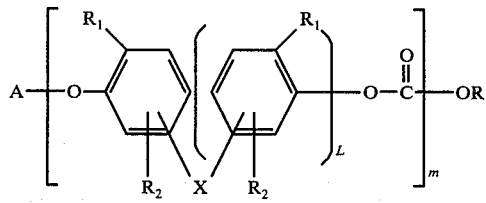

in which independently at each occurrence $R_1$ is selected from the group consisting of alkyl, cycloalkyl, and aralkyl radicals, $R_2$ is selected from the group consisting of hydrogen and $R_1$, A is selected from the group consisting of hydrogen and

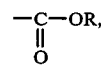

R is selected from the group consisting of alkyl, aryl, alkaryl, aralkyl, cycloalkyl and

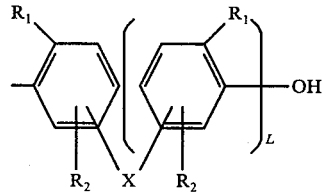

Groups, X is selected from the group consisting of —CH₂SCH₂—, and

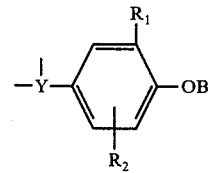

where Y is a hydrocarbon radical, B is

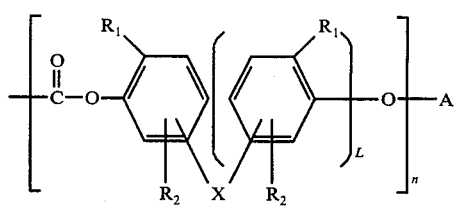

L is 0 or 1, m is 1 to about 20, and n is an average of 0.1 to about 20.

2. A stabilizer composition according to claim 1 in which the weight ratio of the organic phosphite to the carbonate ester is between 5 to 1 and 1 to 2.

3. A stabilizer composition according to claim 1 in which the organic phosphite contains at least one polycyclic polyhydric phenol group.

4. A stabilizer composition according to claim 1 in which the carbonate ester is a carbonate ester of an ortho-substituted polyhydric phenol having in the molecule an odd number of benzenoid rings.

5. A stabilizer composition according to claim 1 in which the carbonate ester is an ester of 2,5-di-t-butylhydroquinone.

6. A stabilizer composition useful in synergistically increasing the resistance of a synthetic resin to deterioration when heated at 150° C, comprising in combination (a) at least one organic phosphite having linked to phosphorus through oxygen at least two alkyl groups having from 6 to 20 carbon atoms and at least one polycyclic polyhydric phenol group and (b) at least one carbonate ester of an ortho-substituted bis phenol having an average molecular weight between 400 and 4000 and having the formula:

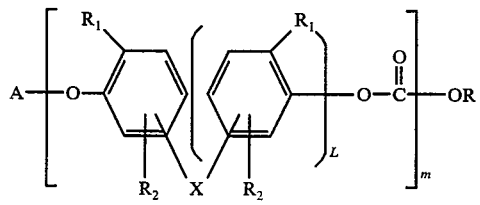

in which independently at each occurrence $R_1$ is selected from the group consisting of alkyl, cycloalkyl, and aralkyl radicals, $R_2$ is selected from the group consisting of hydrogen and $R_1$, A is selected from the group consisting of hydrogen and

R is selected from the group consisting of alkyl, aryl, alkaryl, aralkyl, cycloalkyl and

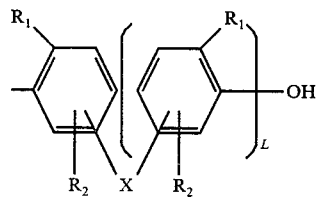

groups, X is selected from the groups consisting of a direct linkage, a two-valent hydrocarbon group having one to ten carbon atoms, oxygen, —S—, and

L is one and $m$ is one to about 20.

7. A stabilizer composition according to claim 1 in which the carbonate ester is an ester of trisphenol.

8. A stabilizer composition according to claim 3 in which the organic phosphite is 4,4'-isopropylidenebis(2-t-butyl-phenol) di (nonylphenyl) phosphite.

9. A stabilizer composition according to claim 3 in which the organic phosphite is tetra($C_{12}$-$C_{15}$ alkyl)4,4'-isopropylidenediphenol diphosphite.

10. A stabilizer composition according to claim 3 in which the organic phosphite is tetratridecyl 4,4'-n-butylidenebis(2-t-butyl-5-methylphenol) diphosphite.

11. A stabilizer composition according to claim 4 in which the organic phosphite is distearyl pentaerythritol diphosphite.

12. A stabilizer composition according to claim 3 in which the organic phosphite is hexatridecyl 1,1,3-tris(2'-methyl-4'-hydroxy-5'-t-butylphenyl)butane triphosphite.

13. A stabilizer composition according to claim 1 in which the organic phosphite has the formula $(R_3(C_6H_4)_aO)_bP(O)_3$-bZ in which independently at each occurrence a is zero or one, b is one or two, $R_3$ is an alkyl group having from 6 to 20 carbon atoms, and when t is two Z is $ArX_2ArOA_2$ where Ar is a carbocyclic aromatic nucleus, $X_2$ is selected from the group consisting of a divalent saturated hydrocarbon radical and

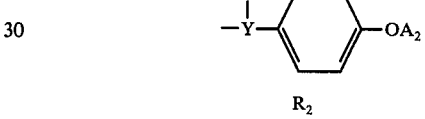

where Y is saturated hydrocarbon radical, and $A_2$ is selected from the group consisting of hydrogen and $P(O(C_6H_4)_aR_3)_2$, and; when b is one, Z is one

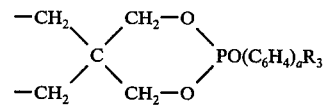

group or two $ArX_2ArOA_2$ groups, in at least one of which $A_2$ is $P(O(C_6H_4)_aR_3$.

14. A stabilizer composition according to claim 1 containing as an additional stabilizing ingredient at least one compound selected from the group consisting of thiodipropionate esters, 1,2-epoxides, and metal salts of monocarboxylic acids having 6 to 24 carbon atoms.

15. A stabilized synthetic resin composition comprising a synthetic resin and a stabilizing amount of a stabilizer composition according to claim 1.

16. A resin composition according to claim 15 in which the quantity of stabilizer composition is from 0.002 to 10 per cent by weight of the synthetic resin.

17. A resin composition according to claim 15 in which the resin is at least one polymer selected from the group consisting of olefin polymers, acrylic polymers, vinyl halide polymers, and polyamides.

18. A resin composition according to claim 17 in which the resin is an acrylonitrile-butadiene-styrene copolymer.

19. A resin composition according to claim 17 in which the resin is an ethylene-vinyl acetate copolymer.

* * * * *